(12) United States Patent
Genter et al.

(10) Patent No.: US 7,455,613 B2
(45) Date of Patent: Nov. 25, 2008

(54) ECCENTRIC GEARING

(75) Inventors: Gerhard Genter, Achern (DE); Willi Schmidt, Stutensee-Buechig (DE); Martin Meyer, Karlsruhe-Gruenwetterbach (DE)

(73) Assignee: Robert Bosch GmbH, Stuttgart (DE)

( * ) Notice: Subject to any disclaimer, the term of this patent is extended or adjusted under 35 U.S.C. 154(b) by 187 days.

(21) Appl. No.: 10/587,417

(22) PCT Filed: Feb. 2, 2005

(86) PCT No.: PCT/EP2005/050446

§ 371 (c)(1),
(2), (4) Date: Jul. 27, 2006

(87) PCT Pub. No.: WO2005/090826

PCT Pub. Date: Sep. 29, 2005

(65) Prior Publication Data

US 2007/0161451 A1  Jul. 12, 2007

(30) Foreign Application Priority Data

Mar. 19, 2004 (DE) ........................ 10 2004 013 543

(51) Int. Cl.
*F16H 3/70* (2006.01)
(52) U.S. Cl. ..................................................... 475/162
(58) Field of Classification Search ................ 475/162, 475/163, 176, 178; 297/362.14, 371
See application file for complete search history.

(56) References Cited

U.S. PATENT DOCUMENTS

| 4,512,213 | A | 4/1985 | Newton et al. |
| 6,280,359 | B1 | 8/2001 | Moskob |
| 2004/0014545 | A1* | 1/2004 | Branov et al. ............... 475/11 |

FOREIGN PATENT DOCUMENTS

| DE | 32 14 592 | 10/1983 |
| DE | 295 21 247 | 12/1996 |
| DE | 197 09 852 | 9/1998 |
| EP | 0 450 324 | 10/1991 |
| EP | 0 981 696 | 3/2000 |
| JP | 04092606 | 3/1992 |
| WO | 99/39114 | 8/1999 |

* cited by examiner

*Primary Examiner*—Sherry L Estremsky
*Assistant Examiner*—Edwin A Young
(74) *Attorney, Agent, or Firm*—Michael J. Striker

(57) ABSTRACT

Eccentric gearing (10) for displacing two parts positioned in a manner that enables them to move relative to one another. The eccentric gearing includes a gearing housing (12), an eccentric element (20), which is driven by a rotary drive (28) and on which an eccentric gear (30) is rotationally mounted, and it includes an output element (40), which interacts with the eccentric gear (30) by meshing therewith in sections. The eccentric gear (30) is actively connected to a coupling element (54) placed inside a recess (67) of a fastening flange (60) that enables the eccentric gearing (10) to be fixed on one of the two parts (8, 9).

12 Claims, 2 Drawing Sheets

ECCENTRIC GEARING

CROSS-REFERENCE TO RELATED APPLICATIONS

This application claims priority under 35 U.S.C. 199(a)-(d) to German patent application number DE 10 2004 013 543.6, filed Mar. 19, 2004.

BACKGROUND OF THE INVENTION

1. Field of the Invention

The present invention relates to eccentric gearing for displacing two parts positioned in a manner that enables them to move relative to one another.

2. Description of Related Art

Publication EP 0 981 696 B1 makes known an electric motor with an eccentric gearing system, with which an eccentric gear mounted on an eccentric is located on a bolt integrated in the motor housing. The drive for the eccentric is an electric motor that is either electrically commutated or has brushes, and is located directly in the housing of the eccentric gearing system. A driving element connected with the eccentric is designed integral with the armature of the electric motor, the armature also being rotatably mounted on the bolt. The eccentric gear includes guide elements that are guided either directly in the stationary housing cover in an opening serving as a guide, or they are guided into openings located in a sliding piece which is accommodated in a housing cover and is displaceably guided therein.

A device of this type has the disadvantage that, when high levels of torque are produced and act on the output element, e.g., when strong displacement forces are produced or if a crash occurs, the eccentric gear and the gearing housing can become damaged quickly. A gearing device of this type is therefore not suited for use in adjustment applications in the motor vehicle, e.g., seat adjustments, on which high safety requirements are placed.

BRIEF SUMMARY OF THE INVENTION

The eccentric gearing according to the present invention has the advantage that, by locating a stable fastening flange around a coupling element that interacts with the eccentric gear, it is possible to redirect torques that act on the output element to chassis-mounted parts via the fastening flange. As a result of the frictional connection of the output element via the eccentric gear directly with the coupling element and, via this, directly with the fastening flange, the rotary drive with its force-transmission path to the driving element of the eccentric is protected against excessive force. The gearing housing is also protected against excessive power flow, which means it can be advantageously made of plastic.

Due to the measures listed herein, advantageous refinements and improvements of the invention are made possible. If the fastening flange includes recesses which are designed, e.g., as openings in the flange, the gearing housing parts can be fastened to it, and the entire eccentric gearing can be fastened to one of the parts which move relative to each other.

If the fastening flange is made of metal, e.g., steel, it can transmit particularly high forces without the gearing being destroyed. In addition, radial flaps can be favorably integrally formed thereon, the radial flaps including recesses used for fastening to one of the parts which move relative to each other.

If the gearing housing is made of plastic, additional gearing elements can be mounted therein directly, with minimal friction. Due to the design of an axially installable gearing housing cover, the two housing parts can be advantageously fixed to the stably designed fastening flange.

In order to radially center the body and cover of the gearing housing relative to each other and to the remaining gearing components during assembly of the gearing, the fastening flange includes at least one collar with a radial support surface, against which the housing parts bear radially.

To force the eccentric gear to make an eccentric motion around the central housing axis, guide elements are located on the coupling element, the guide elements interacting with the eccentric gear and the fastening flange such that the coupling element is guided along a line without rotating.

To this end, the fastening flange includes radially oriented projections that interact with radially oriented counter-elements, e.g., open elongated holes, of the coupling element.

In addition, the coupling element includes further radially oriented guide elements which are oriented nearly perpendicularly to the first guide rails and interact with corresponding counter-elements of the eccentric gear.

To transfer high torques which act on the eccentric gearing, the fastening flange includes support surfaces, against which corresponding support surfaces of the coupling element bear, in order to transfer the torque in both directions. Particularly favorably, the guide surfaces of the guide elements can serve simultaneously as support surfaces.

To achieve a compact design of the eccentric gearing, and in particular to attain a small outer diameter, the eccentric gear has external toothing which meshes with corresponding internal toothing—which has a different number of teeth—of the output element.

To achieve a small outer diameter of the gearing, a bolt—as an extension of the output element—is designed as the central axis, the individual gearing elements being located on the bolt. To realize a further reduction stage, the driving element can be driven via a wormwheel by a worm shaft of an electric motor.

To absorb the forces acting on the output element, the output element is mounted radially and/or axially in the cover of the gearing housing. To this end, the cover of the gearing housing is preferably made of metal. A portion of the output element extends out of an opening of the cover and forms an interface—which can have any shape—with the adjustment mechanisms of the part to be adjusted and/or the part attached to the housing.

BRIEF DESCRIPTION OF THE DRAWINGS

Various exemplary embodiments of a device according to the present invention are presented in the drawing and are described in greater detail in the description below.

DETAILED DESCRIPTION OF THE INVENTION

Figure 1:
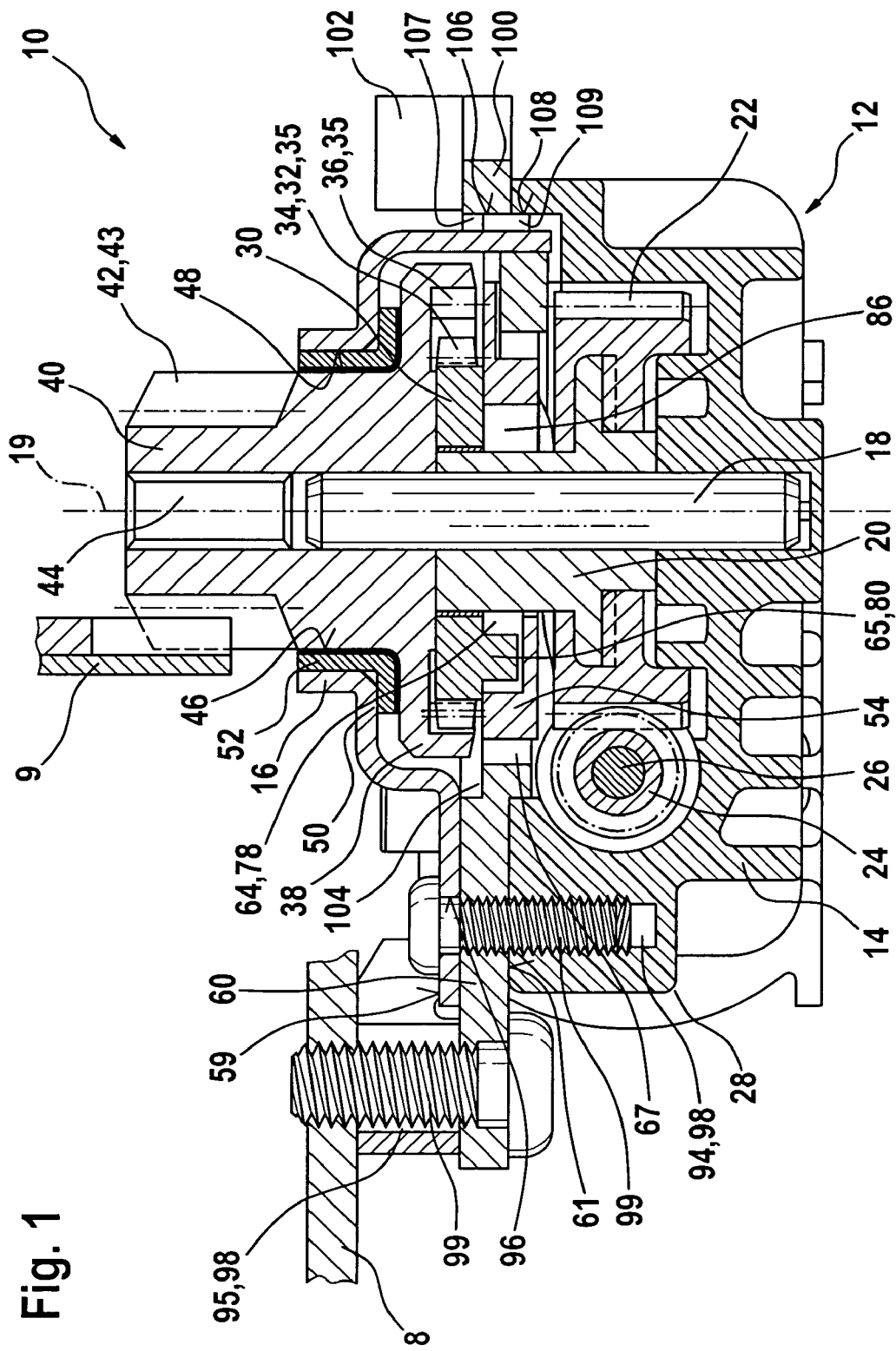
FIG. 1 shows a cross section through an eccentric gearing, according to the present invention, through A-A.

FIG. 1 shows eccentric gearing 10 with a gearing housing 12 that includes a body 14 made of plastic and a cover 16, which is made, e.g., of metal. A bolt 18 is located in gearing housing 12, on which an eccentric element 20 is rotatably mounted. Eccentric element 20 is rotatably connected with a worm gear 22, which meshes with a worm 24. Worm 24 is located, e.g., on an armature shaft 26 of a not-shown electric motor 28 which causes eccentric element 20 to rotate around support bolt 18. In a further, not-shown exemplary embodiment, eccentric element 20 is driven directly by an armature of electric motor 28, as shown, e.g., in EP 0 981 696 B1.

An eccentric gear 30 with spur gearing 34 designed as external toothing 32 is mounted on eccentric element 20, eccentric gear 30 being supported such that it can rotate freely around eccentric element 20. External toothing 32 meshes with internal toothing 36 of a ring gear 38 which is designed as an output element 40. To transmit the output torque to not-shown kinematics of a seat frame, output element 40 has, e.g., groove toothing 42, serration 43, or an inner polyhedron 44, with which a force-transmission element 9 of seat linkage meshes in a form-fit manner. Eccentric element 20 and output element 40 with internal gear 38 are located axially one above the other on support bolt 18. Output element 40 is mounted non-rotatably and eccentric element 20 is mounted rotatably on support bolt 18, for example, support bolt 18 being rotatably mounted in gearing housing 12. Output element 40 bears radially via a radial outer surface 46 against a circular opening 48 of cover 16. In addition, cover 16 has an axial shoulder 50, against which output element 40 and, via this, driving element 20 and eccentric gear 30 bear axially. If cover 16 is made, e.g., of steel, a bearing bush 52 is located between output element 40 and cover 16, bearing bush 52 being made, e.g., of plastic, in order to support the eccentric gearing with reduced friction. The number of teeth 35 in internal toothing of ring gear 38 differs from the number of teeth in external toothing 32 of eccentric gear 30, by way of which a differing reduction ratio can be realized. Eccentric gear 30 is guided by eccentric element 20 and is prevented from rotating by a coupling element 54. To this end, coupling element 54 includes first guide elements 56 which engage in corresponding counter-elements 57 of a fastening flange 60 located between body 14 and cover 16. As a result, coupling element 54 is capable of being moved relative to fastening flange 60 only along a line 62. To couple fastening flange 60 with eccentric gear 30, coupling element 54 includes second guide elements 64 which interact with corresponding counter-elements 65 of eccentric gear 30. Guide and counter-elements 54, 30 are designed such that eccentric gear 30 can also move—relative to coupling element 54—exclusively along a second line 66, which is located approximately perpendicular to line 62. Since eccentric gear 30 can now move—relative to fastening flange 60—only along two lines 62, 66 positioned nearly perpendicularly to each other, eccentric gear 30 is prevented from rotating by coupling element 54. As a result, output element 40 walks around eccentric gear 30 in accordance with the reduction ratio.

Figure 2:
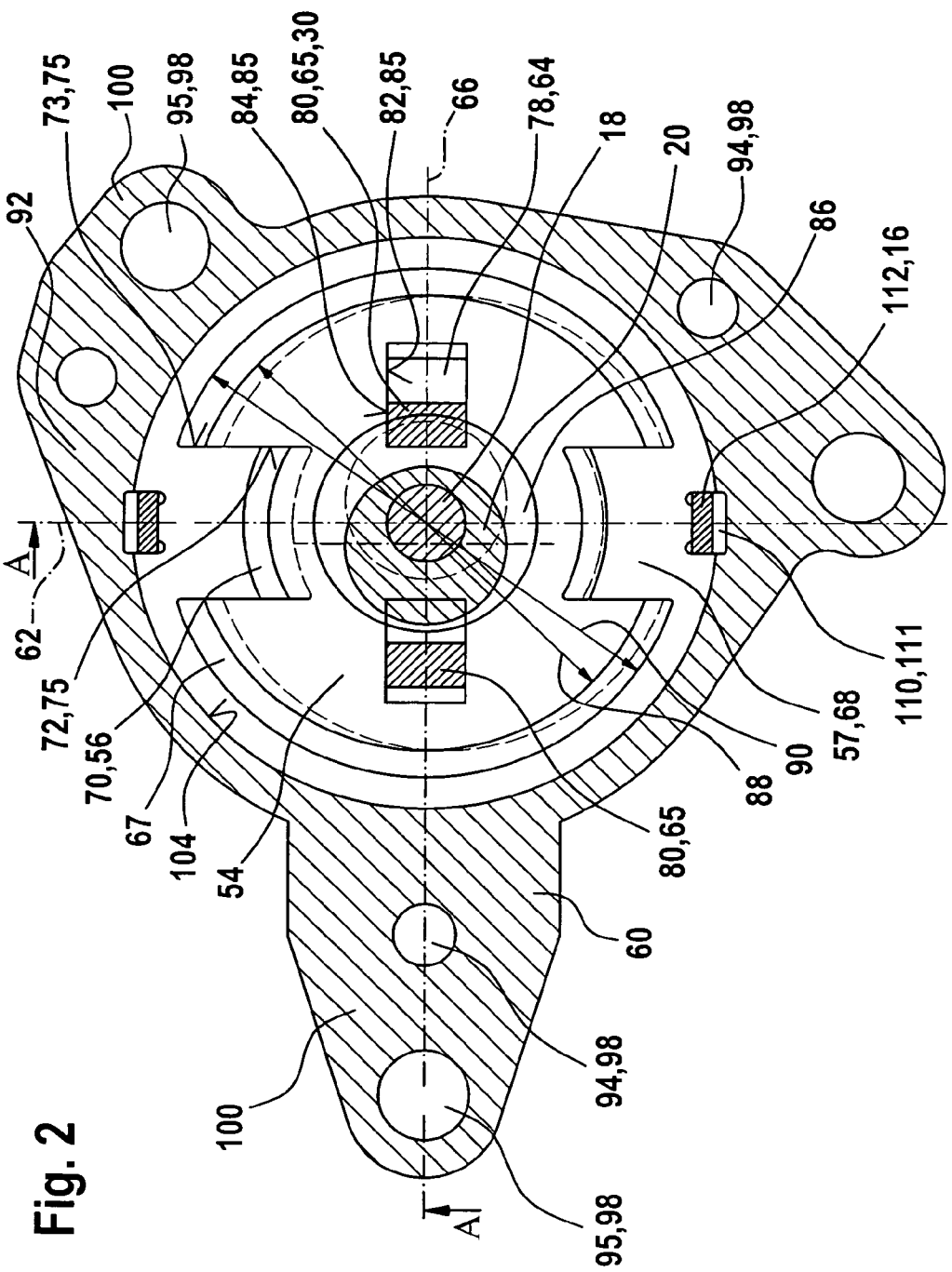
FIG. 2 shows a radial cross section of the eccentric gearing through II-II.

In the exemplary embodiment, as shown in the cross section in FIG. 2, fastening flange 60 includes radial segments 68, as first counter-elements 57, which engage in radial recesses 70 that form first guide elements 56. Coupling element 54 is guided along lateral guide surfaces 72 of first guide elements 56 along corresponding lateral counter-guide surfaces 73 of fastening flange 60. Simultaneously, guide and counter-guide surfaces 72, 73 serve as support shoulders 75, via which torque is transmitted between coupling element 54 and fastening flange 60. Second guide elements 64 of coupling element 54 are designed as second radial recesses 78, into which guide bolts 80 designed as second counter-guides 65 engage. Radial recesses 78 include both guide surfaces 82, against which guide bolts 80 bear via counter-guide surfaces 84 and force eccentric gear 30 to move relative to coupling element 54 along line 66. Second guide and counter-guide surfaces 82, 84 are also designed as second support shoulders 85, via which torque is transmitted between eccentric gear 30 and coupling element 54. Coupling element 54 includes a central, e.g., circular opening 86. Eccentric element 20, which penetrates opening 86, can rotate around central axis 19 inside opening 86. In this case, the exterior shape of coupling element 54 is designed nearly circular in shape, and its outer diameter 88 is smaller than the inner diameter 90 of the nearly circular recess 67 of fastening flange 60, in order to enable displacement of coupling element 54 along axis 62. First guide elements 56 and second guide elements 64 of coupling element 54 are designed as recesses 70, 78 which open radially outwardly or radially inwardly toward opening 86. In alternative designs, recesses 70, 78 can also be designed as closed elongated holes or tangential parallel guide surfaces, depending on the shape of guide elements 56, 64 and counter-elements 57, 65.

Fastening flange 60 encircles entire coupling element 54, which is located inside recess 67. Coupling element 54 is located at the same axial level as fastening flange 60 in a plane perpendicular to support bolt 18. Recesses 94 for connecting elements 99, e.g., screws or rivets, are formed in an outer edge region 92 of fastening flange 60, via which cover 16 and body 14 are connected with each other and/or with fastening flange 60. To this end, screws 99 are located, e.g., in corresponding counter-recesses 96 of cover 16, screws 99 penetrating recesses 94 designed as holes and being screwed into body 14. Gearing housing 12 is therefore tightly closed and fastening flange 60 is integrated in gearing housing 12. As a result, one of the housing parts 14 or 16 bears against an axial side 59, 61 of fastening flange 60. Fastening flange 60 includes further projections 100 which extend beyond the gearing housing, and recesses 95 for fastening elements 99 which connect fastening flange 60 with one of the parts 8, 9 which are movable relative to each other. Recesses 95 are also designed, e.g., as round holes 98 that accommodate, e.g., screws 99 or rivets 99. Spacers 102 are located on recesses 95 in order to position eccentric gearing 10 relative to one of the parts 8, 9 which are movable relative to each other. Fastening flange 60, which is produced, e.g., as a stamped sheet metal part, has a hole 104 in its interior region, by way of which a radial inner surface 106 and a radial outer surface 108 are formed. As a result, fastening flange 60 serves as a centering element for housing parts 14 and 16, cover 16 bearing against radial inner wall 106 with an outer edge 107, and body 14 bearing against radial outer wall 108 with a recess 109. In addition to this radial fixation, fastening flange 60 includes further recesses 111 as rotation-prevention elements 110, in which form-fit counter-elements 112 of cover 16 engage.

In an application for seat adjustment, according to the present invention, eccentric gearing 10 is connected via recesses 95 of fastening flange 60 with a seat frame 8, 9, output element 40 being operatively connected via interface 42, 43, 44 with a part 8, 9 which is movable relative to the seat frame, e.g., the seat back. If high levels of torque now act on output element 40 when the vehicle is struck from behind, they are transmitted by eccentric gear 30 via support shoulders 85 to coupling element 54, and, from this, via support shoulders 75 directly to fastening flange 60, and are therefore absorbed by the seat frame. As a result, electric motor 28 and first gear stage (worm 24, worm gear 22 and gearing housing 12) are not subjected to excessive force.

In a not-shown, alternative exemplary embodiment, coupling element 54 is designed integral with eccentric gear 30. Coupling element 54 has external toothing that engages directly with internal toothing of fastening flange 60. Eccentric gear 30 with coupling element 54 is located such that it can rotate freely, the reduction resulting from the ratio of the tooth pairing of coupling element 54 with fastening flange 60 to the tooth pairing of internal toothing 36/external toothing 32. In this case as well, the high crash torques introduced via output element 40 are transmitted via the external toothing of coupling element 54 directly to the internal toothing of fastening flange 40 and, therefore, to the seat frame. The external toothing of coupling element 54 can be designed to be continuous with the external toothing 32 of eccentric gear 30, or it can designed as offset toothing.

It should be noted that, with regard for the exemplary embodiments presented in the figures and the description, many different combinations of the individual features are possible. For example, the specific embodiment of fastening flange 60, coupling element 54 and eccentric gear 30 with first and second guide elements 56, 64 with corresponding counter-elements 57, 65 or the angle between the two lines 62 and 66 can be varied in any manner possible. The important aspect is that it be possible for high torques acting on eccentric gearing 10 to be directed away via a form-fit connection of coupling element 54 with fastening flange 60 via fastening flange 60, which is designed to have load-bearing capacity. As a result, housing 12 and the other components that are not located in the power flow can be made of lower-cost materials optimized for use for gearing, such as plastic. The application of eccentric gearing 10 is not limited to adjusting seat parts in a motor vehicle. Instead, it can be used with any adjustment devices with which high torques need to be absorbed.

What is claimed is:

1. Eccentric gearing (10) for displacing two parts positioned in a manner that enables them to move relative to one another, comprising: a gearing housing (12), an eccentric element (20) driven by a rotary drive (28) and on which an eccentric gear (30) is rotationally mounted, and an output element (40), which interacts with the eccentric gear (30) by meshing therewith in sections,
wherein
   the eccentric gear (30) is actively connected to a coupling element (54) placed inside a recess (67) of a fastening flange (60) that enables the eccentric gearing (10) to be fixed on one of the two parts (8, 9) and
wherein
   the gearing housing (12) includes a body (14) made of plastic, and a cover (16), each of which is fastened to an axial side (59, 61) of the fastening flange (60).

2. The eccentric gearing (10) as recited in claim 1,
wherein
   the fastening flange (60) includes recesses (94, 95) for connecting elements (99), which interact with one or both parts (8, 9) and/or with the gearing housing (12, 14, 16).

3. The eccentric gearing (10) as recited in claim 2,
wherein
   the fastening flange (60) is made of metal and includes regions (100) which extend beyond the gearing housing (12), and in which the recesses (95) are located.

4. The eccentric gearing (10) as recited in claim 1,
wherein
   the fastening flange (60) includes at least one cylindrical jacket-shaped surface (106, 108), against which the body (14) and/or the cover (16) bear radially.

5. The eccentric gearing (10) as recited in claim 1,
wherein
   the coupling element (54) includes guide elements (56, 64) that interact with corresponding counter-elements (57, 65) to force the eccentric gear (30) into superimposed movement along first and second lines (62, 66) positioned nearly perpendicularly to each other, and to prevent the eccentric gear (30) from rotating.

6. The eccentric gearing (10) as recited in claim 5,
wherein
   the eccentric gear (30) includes axial guide bolts (65, 80) that engage in second radial recesses (64, 78) of the coupling element (54) to guide the motion of the eccentric gear (30) relative to the coupling element (54) along the second line (66).

7. The eccentric gearing (10) as recited in claim 1,
wherein,
   when torque acts via the output element (40) on the coupling element (54), the coupling element (54) bears directly against fastening flange (60) via support shoulders (75).

8. The eccentric gearing (10) as recited in claim 1,
wherein
   the eccentric element (20) is fastened to a support bolt (18) supported in the gearing housing (12) and is driven by an electric motor (28) via a wormwheel (22, 24).

9. The eccentric gearing (10) as recited in claim 1,
wherein
   the output element (40) is supported in the cover (16) of the gearing housing (12) and displaces a seat part (8, 9) in the motor vehicle using a form-fit interface (42, 43, 44).

10. The eccentric gearing (10) as recited in claim 1,
wherein
   high levels of torque acting on the eccentric gearing (10) are redirected via support shoulders to coupling element (54) and then, via support shoulders to fastening flange (60) thereby not subjecting gearing housing (12) to excessive force.

11. Eccentric gearing (10) for displacing two parts positioned in a manner that enables them to move relative to one another, which includes a gearing housing (12), an eccentric element (20), which is driven by a rotary drive (28) and on which an eccentric gear (30) is rotationally mounted, and including an output element (40), which interacts with the eccentric gear (30) by meshing therewith in sections,
wherein
   the eccentric gear (30) is actively connected to a coupling element (54) placed inside a recess (67) of a fastening flange (60) that enables the eccentric gearing (10) to be fixed on one of the two parts (8, 9)
wherein
   the coupling element (54) includes guide elements (56, 64) that interact with corresponding counter-elements (57, 65) to force the eccentric gear (30) into superimposed movement along two lines (62, 66) postioned nearly perpendicularly to each other, and to prevent the eccentric gear (30) from rotating and
wherein
   the fastening flange (60) includes radial segments (57, 68) that engage in first radial recesses (56, 70) of the coupling element (54) to guide the motion of the coupling element (54) relative to the fastening flange (60) along the first line (62).

12. The eccentric gearing (10) as recited in claim 11
wherein
   the eccentric gear (30) is designed as a spur gear (34) with external toothing (32) which mesh with internal toothing (36) of the output element (40), which is designed as a ring gear (38).

* * * * *